United States Patent [19]
Pahr

[11] Patent Number: 5,287,008
[45] Date of Patent: Feb. 15, 1994

[54] ELECTROSTATIC DISCHARGE NOISE SUPPRESSION METHOD AND SYSTEM FOR ELECTRONIC DEVICES

[75] Inventor: Per O. Pahr, Lier, Norway
[73] Assignee: Tandberg Data A/S, Oslo, Norway
[21] Appl. No.: 698,099
[22] Filed: May 10, 1991

[30] Foreign Application Priority Data

Jul. 31, 1990 [EP] European Pat. Off. ........ 90114727.2

[51] Int. Cl.$^5$ .......................... H04B 15/00; H05F 3/02
[52] U.S. Cl. ........................................ 307/91; 307/89;
333/12; 361/684; 361/816
[58] Field of Search ................ 361/58, 111, 212, 220,
361/424; 307/89, 91; 363/47; 333/12, 181

[56] References Cited

U.S. PATENT DOCUMENTS

| | | | |
|---|---|---|---|
| 3,516,026 | 6/1970 | Curran et al. | 333/12 |
| 3,681,612 | 8/1972 | Vogl et al. | 333/12 X |
| 3,697,896 | 10/1972 | Sarkozi et al. | 333/181 |
| 3,920,925 | 11/1975 | Lindow | 333/12 X |
| 4,342,013 | 7/1982 | Kallman | 333/181 |
| 4,435,764 | 3/1984 | El-Gohary | 323/902 X |
| 4,751,607 | 6/1988 | Smith | 361/119 |
| 4,843,325 | 6/1989 | McKee, Jr. | 324/439 |
| 4,847,873 | 6/1989 | Kuwaoka et al. | 375/99 |
| 4,888,675 | 12/1989 | Kumar et al. | 333/181 X |
| 4,903,185 | 2/1990 | Fiorina et al. | 363/40 |
| 4,958,255 | 9/1990 | Pritchard | 361/212 |
| 5,031,066 | 7/1991 | Wagner et al. | 361/56 |
| 5,083,101 | 1/1992 | Frederick | 333/181 |

FOREIGN PATENT DOCUMENTS 0300872 1/1989 European Pat. Off. .

OTHER PUBLICATIONS

Siemens-Zeitschrift 51 (1977), vol. 8, "Schnittstellenfilter fur Daten-und Signalleitungen", by Von Viktor Seiler and Josef Wimmer, pp. 620–624.
2209 JEE Journal of Electronic Engineering, vol. 18, (1981), Jun., No. 174, Tokyo, Japan, "EMC in Electronic Systems Growing in Sophistication", by Yuichi Murakami, pp. 44–49.
Hewlett Packard Course No. HP 11949A, Student Workbook, 1989, "Designing For Electromagnetic Compatibility", pp. 9–11, 9–15, and 9–16.
Siemens "Neues aus der Forschung", May 31, 1990.
Siemens Aktiengesellschaft, "EMC EMI Suppression Components Filters", Data Book 1987/1988.
"Noise Reduction Techniques in Electronic Systems", Second Edition, Henry W. Ott, AT&T Bell Laboratories, John Wiley & Sons, New York, 1988.
Pp. 97 and 98 of an unidentified dictionary source—a prior art publication describing common mode conversion and common mode interference sources.

Primary Examiner—A. D. Pellinen
Assistant Examiner—Fritz M. Fleming
Attorney, Agent, or Firm—Hill, Steadman & Simpson

[57] ABSTRACT

An electrostatic discharge noise suppression method and system is disclosed for electronic devices, particularly those connected to data buses. Electrostatic discharge protection is provided by breaking high-frequency ground loops by inserting common mode inductors where they can be most effective-in the DC power supplies themselves, in the DC power connections, or just behind the DC connector in the electronic devices. Saturation of the cores of the common mode inductors is prevented in a preferred way by equalizing supply and return currents in the common mode inductors and by preventing DC ground currents from flowing in a chassis between the power supply and the electronic device.

24 Claims, 5 Drawing Sheets

ELECTROSTATIC DISCHARGE NOISE SUPPRESSION METHOD AND SYSTEM FOR ELECTRONIC DEVICES

BACKGROUND OF THE INVENTION

The invention is directed to a noise suppression method and circuit for an electronic device for suppressing electrostatic discharge (ESD) noise pulses which affect the electronic device and data buses connected to these devices.

Most of the problems encountered with ESD are caused by electrostatically charged human bodies touching the electronic devices, either its chassis or external cables, causing discharge currents to flow towards ground. For example, hard to solve problems occur when tape cassettes, cartridges or diskettes are inserted into data storage devices. These devices are usually mounted as subassemblies in the computer chassis.

During a discharge event, tens of amperes can flow in less than a nanosecond. An electromagnetic wave will propagate towards ground on the chassis and the cables leaving the device. Due to the very high frequencies involved, much of the prior art ESD problem solving has been directed towards proper shielding and grounding of the electronic devices. The coupling mechanisms can be divided into four parts: Direct conduction, secondary arcing, electric field, and magnetic field couplings. To solve the problems associated with electric field coupling to the circuits, it is recommended not to float the signal grounds with respect to the chassis ground or not to provide an external ground connection independent of the chassis ground to the electronic devices. A multiple grounding scheme is therefore often used for the devices inside the chassis. To solve the problems with magnetic coupling, shielding is usually recommended. However, for cables used for data buses, problems arise due to this multiple grounding scheme. When the signal ground of, say, both ends of a data bus cable is connected to the chassis, a ground loop is formed. Noise currents can then flow if the chassis potential is different at the two ends or if voltages are induced in the loop due to magnetic coupling. For a discussion of the prior art, see Ott, H. W., "Noise Reduction Techniques in Electronic Systems", 2nd ed. John Wiley & Sons, New York, 1988; and Hewlett Packard Course No. HP 11949A; "Designing for Electromagnetic Compatibility", Application Support Division, Mountain View, Calif., U.S.A., 1989.

It is known in the art that ESD protection of the data buses can be obtained by using ferrite tubes or clamped ferrite pieces around the signal cables. See Murakami, Yuichi, JEE Journal of Electronic Engineering, Vol. 8, No. 174, July 1981, page 49, FIG. 8; and Hewlett Packard Course No. HP 11949A, supra.

The function of these ferrite components is then as a common-mode inductor.

The problem with these data bus protection schemes can be divided into two parts. First, due to the leakage inductance of the common mode inductors available, the high frequency components of the differential signal currents may also be attenuated if the common mode impedance is too high. It is therefore very difficult to obtain a good protection against noise. Second, the data buses typically consist of as many as 50 signal and ground wires and a common mode inductor for all these signal lines becomes very expensive. An alternative consists of using ferrite clamps around the cables, but even those tend to be expensive parts.

It can be also mentioned here that other types of usage exists for common-mode inductors. They can be used to prevent conducted radiated electromagnetic noise from leaving the devices via cables. See, for example, Siemens Aktiengesellschaft, "EMC EMI Suppression Components, Filters", Data Book 1987/88. For signal lines, the leakage inductance can also be utilized to limit the bandwidths of the differential signal waveforms transmitted on the cables.

SUMMARY OF THE INVENTION

It is an object of the invention to provide a noise suppression system for an electronic device such that electrostatic noise discharges which occur in pulse-like fashion and only sporadically, but which can create considerable noise currents, can be reliably controlled in a simple and cost-beneficial way.

In laboratory investigations I have conducted, I have found that a strong, mainly inductive, electromagnetic coupling exists between the chassis ground and the DC power supplies usually contained within the electronic systems. The reason is that the power supplies are always located close to where the ground wire of the AC mains cable is connected to the chassis and that the leakage inductance of the inductors or transformers found in the power supplies provides the coupling path. The coupled noise will be very strong because the ESD currents concentrate here before leaving the chassis via the mains cable.

According to my invention, I have recognized that the relevant ESD problems originate from the coupling to the DC power supplies, and that multiple ground loops are formed between the chassis, via the coupling to the DC power wires, to the local ground on the electronic devices where disturbances can take place, further via the data bus where the signals are disturbed, and back again via the bus and the ground or chassis connections of the other devices connected to the same signal bus. To avoid electric field coupling or secondary arcing, the signal ground or data bus ground is connected to chassis ground. The invention method and system for ESD protection disclosed and claimed herein therefore comprises breaking the high-frequency ground loops by inserting common mode inductors which operate preferably without saturating their cores and by locating them where they can be most effective: in the DC power supplies themselves, in the DC power connections, or just behind the DC connector in the electronic devices. Measurements have shown that the method and system of this invention provides great improvements compared with the bus-protection method known in the prior art. Saturation of the cores of the common mode inductors is prevented in a preferred way by equalizing supply and return currents in the common mode inductors and by preventing DC ground currents from flowing in a chassis between the power supply and the electronic device.

DESCRIPTION OF THE PREFERRED EMBODIMENTS

Figure 1:
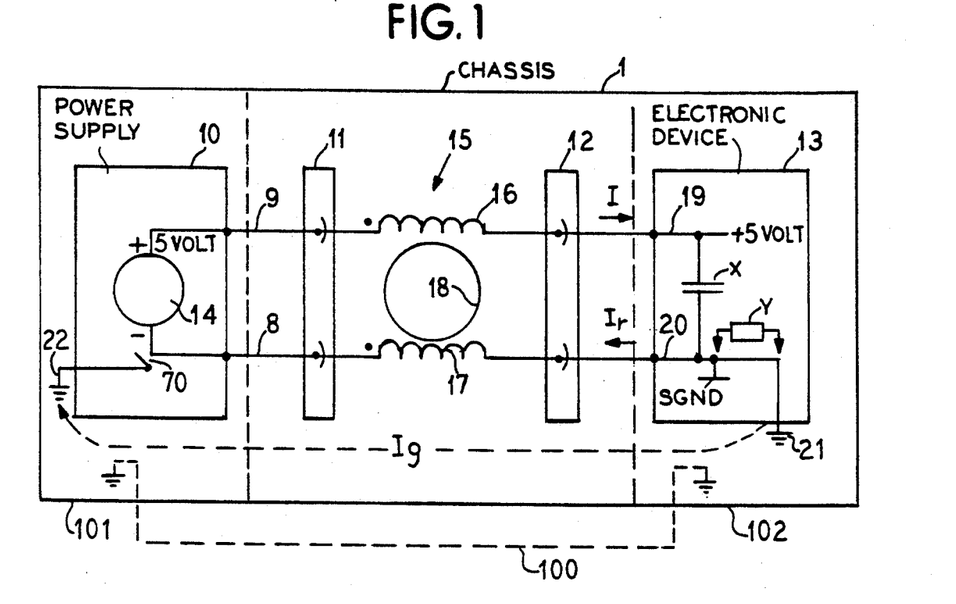
FIG. 1 is a circuit diagram showing and explaining the electrostatic discharge noise suppression method and system in accordance with a first embodiment of my invention.

FIG. 1 shows a first embodiment of the electrostatic discharge noise suppression method and system according to my invention. 10 is a DC power supply contained within what may be a common chassis 1, shown with ground symbols 21 and 22 connecting thereto, indicating grounding to such a common chassis. Of course, if two separate chassis such as 101 and 102 shown in dashed lines are provided, then typically a connecting ground wire 100 shown with dashed lines would be provided between them. Ground wire 100 might be dispensed with, however. The power unit itself is shown with the symbol 14. Within 14 one typically finds linear or switching transformers. The positive output from 14 connects via lead 9 to the power input pin 19 of the electronic device 13. The DC current goes via the load not shown to a signal ground "SGND", of device 13 and out via 20. The signal ground SGND may be different than chassis ground and could, for example, be foil on a printed circuit board mounted in the chassis 1. If the chassis ground connection 22 is not connected to 8, the DC current returns from pin 20 via 8 to the negative side of 14. In between 10 and 13 is inserted a common mode inductor 15 with windings 16 and 17 wound with equal number of turns, in the same direction, on a common core 18. Two connector assemblies are shown as 11 and 12, so that 15 can easily be inserted between 10 and 13. The chassis grounding 21 of the electronic device 13 is usually done via multiple ground wires in a ribbon data or signal cable going to other devices similar to 13. This will be shown in detail in FIG. 7.

To allow for an optimization of the common mode inductor 15 with respect to impedance, self resonant frequency, size and cost, currents "I" and "Ir" should be equal. 8 should therefore not be connected to ground at 22. If 8 is connected to 22, a ground current "Ig" as shown in FIG. 1 with dashed lines will be subtracted from "Ir", so that IR<I, and there is a risk of saturating the core 18. If 18 is saturated, the device will not present the intended common mode impedance to the wave front. The power supplies available on the market usually come with the option for a ground connection 22 or not for the return wires. This option is illustrated by switch 70 shown in an open position. In the case one is forced to use a grounded return, say, if it is already designed into the system, a resistor "Y" should be introduced between the signal ground "SGND" (such as on the foil of a PC board) and the chassis ground connection 21, or between the DC return line 20 at the device 13, if it does not have a separate signal ground, and the chassis ground at 21. If this resistor has a small value of the order of a few ohms, nearly all the return currents will flow back to 8 and the core will not be saturated because the typical DC resistance of windings 16 and 17 is in the range from 0.01 ohms and upwards.

The AC mains ground connection where the electrostatic discharge noise current flows is located close to chassis connection 22. The rapidly changing, very strong magnetic field will induce a high voltage pulse in the loop consisting of 22, wires 9 and 8 in parallel, via 15, to 20 and "SGND" and also via 19 and the decoupling capacitor "X" to "SGND" and further to the chassis ground connection 21 and back again to the first chassis connection 22. The common mode inductor 15 presents a high impedance to the wave front and prevents large noise currents from flowing in the said loop.

If all devices are contained within the same chassis, i.e. if 22 and 21 are different physically located connections on the same common chassis such as shown by the solid line box, the common mode wave can be considered to be a local one. However, 15 is also so designed that it presents a high impedance to the low frequency oscillations, typically in the lower MHz range, which takes place after the discharge excitation. These oscillations can be explained with the aid of a simple model: the ground wire in the mains cable is modeled as an inductance in series with a resistor and this circuit is in parallel with the capacitance from chassis to the external ground, simulating the charges on the chassis. Thus, the system will exhibit damped oscillations with reference to an external ground when excited by the discharge pulse. If the external ground connects via, say, printer cables or local area network cables to the internal ground point 21, common mode waves and oscillatory currents may be set up on these wires. The inventive method and system disclosed herein for electrostatic discharge noise protection is especially well suited for suppression of these oscillatory currents in the lower MHz range because the self resonant frequency of the common mode inductor can easily be placed in this frequency range where the oscillations occur.

A second loop exists in FIG. 1, namely the differential loop where the DC current is flowing when the return wire 8 is not grounded to 22: from 9 via 16 to 19, further via the decoupling capacitor "X" to "SGND" and 20 and back to the power supply 14 via 17 and 8. During the discharge event, a differential voltage is also induced in this loop. Usually, this voltage is much less than the common mode voltage, since the differential loop is much smaller than the common mode loop. The leakage inductance of coils 16 and 17 together with the decoupling capacitor "X" provide attenuation for this differential voltage. The magnetic coupling to this last mentioned loop can also be minimized by twisting the wires 8 and 9 together.

Figure 2:
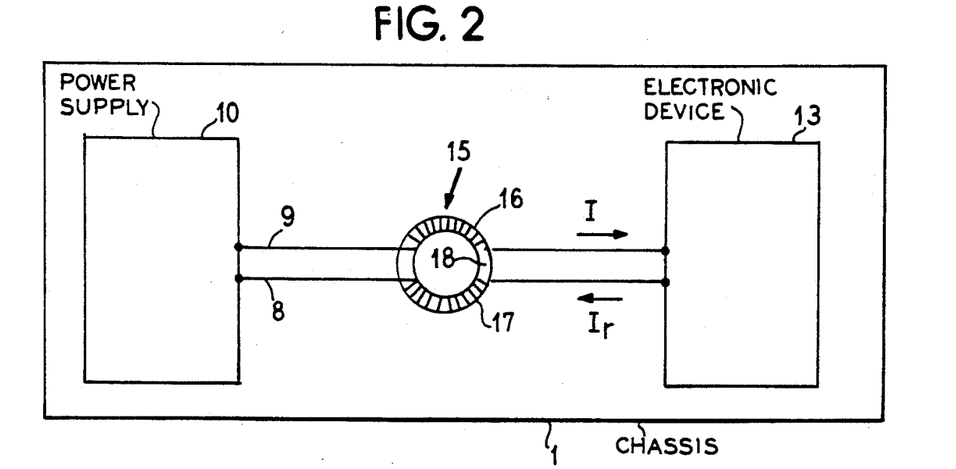
FIG. 2 shows an electrostatic discharge noise suppression coil assembly used in the first embodiment system of FIG. 1.

FIG. 2 schematically shows the electrostatic discharge noise suppression coil used in FIG. 1. The common mode inductor 15 is inserted between the power supply unit 10 and the electronic device 13. These units are contained within one common chassis structure shown in solid lines. It is understood that 15 can also either be implemented as part of 10 or as part of 13. If it is part of power supply 10, great care in the actual location of the common mode inductor within 10 must be taken to avoid magnetic coupling from the electrostatic discharge chassis currents and to the leakage inductance of 15. Care must also be taken to ensure a very low capacitive coupling.

In summary, as shown in FIG. 1 when a connection is not present at 70, the power supply 14 is not connected to chassis ground 22 and is thus "DC separated" from chassis ground. Similarly, when the chassis ground connection 22 is provided at the power supply 14 at the minus terminal, then the DC return line 20 at the device 13 is DC separated from ground by insertion of a resistor Y as previously described to minimize ground current flow. Thus, as used herein, the term "DC separated" either means no DC ground connection at all or a ground connection through a resistance which minimizes DC return ground currents.

FIG. 2 shows windings 16 and 17 placed on each half of a ring-shaped core or toroid. In this case a coupling factor of typically 0.8 can be obtained between windings 16 and 17, providing enough leakage inductance for effective attenuation of the differential mode. If greater emphasis must be put on the attenuation of the common mode, one should also consider making the coils 16 and 17 part of one bifilar winding. Then it may be possible to obtain an even tighter coupling between 16 and 17. Further, special care should be placed on providing a low-capacitance path between the input and output sides of 15 to enhance the high-frequency performance of the component 18. Other types of cores may as well be used to make the common mode inductor.

Figure 3:
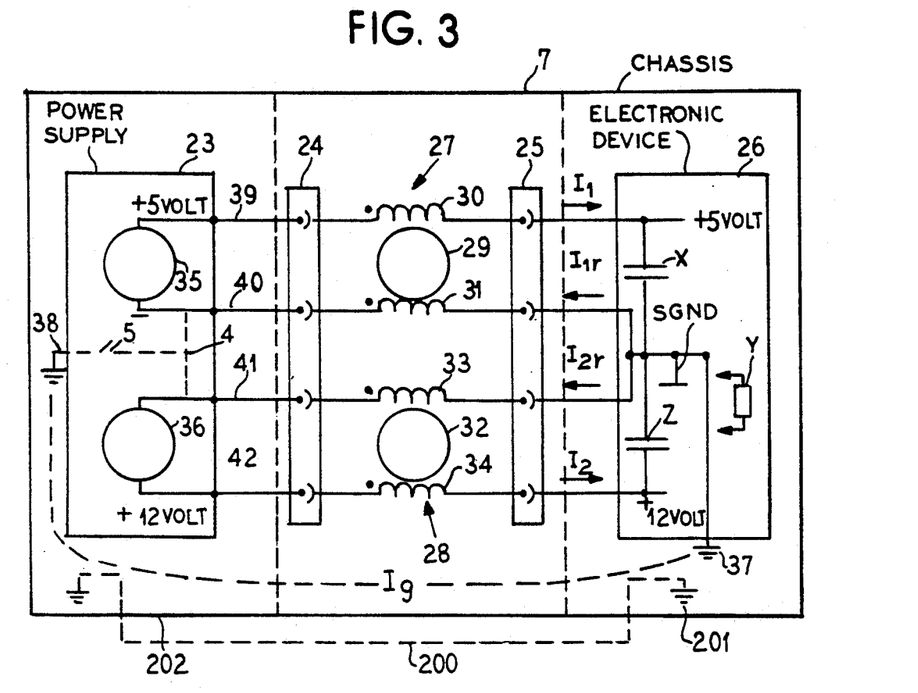
FIG. 3 is a circuit diagram of an electrostatic discharge noise suppression method and system in accordance with a second embodiment of my invention.

FIG. 3 schematically illustrates a second embodiment of the electrostatic discharge noise suppression method and system according to my invention. 23 is a power supply module typically found in many computer systems. It contains a +5 volt supply 35 with output 39 and return 40, and a +12 volt supply 36 with output 42 and return 41. Within 23, returns 40 and 41 are not to be connected together in the embodiment, but might be connected together as shown by dashed line 4 by some existing power supplies. As was the case for FIG. 1, the return wires 40 and 41 should not be connected to the chassis as shown by the open switch 5, but in some cases such a connection 38 already exists. This would be represented by switch 5 being closed. It may have been done to reduce the electromagnetic radiation from the power supply module 23. Between the power module 23 and the electronic device 26 are inserted two common mode inductors 27 and 28, consisting of windings 30/31 on the core 29 and windings 33/34 on the core 32, respectively. Connector assemblies are shown as 24 and 25, but as for the first embodiment, the common mode inductors may as well be physically located at the power supply side 23 if great care is taken or at the electronic device side 26 if this is more convenient. Internally in the electronic module 26 returns "I1r" and "I2r" must nearly always be connected together: the returns are connected to the signal ground, "SGND", in module 26. As described for the embodiment of FIG. 1, a chassis connection 37 must be provided for the signal ground "SGND" at module 26, either directly as shown or via the multiple ground wires of a data or signal cable connecting to subassemblies similar to 26. Decoupling capacitors "X" and "Z" are shown within the electronic device 26, to ease the understanding of the common mode loops. The actual DC loads are not shown. An optional low-value resistor "Y" is shown for the case when the returns of the power units 35 and 36 are connected to the chassis 38 (represented by switch 5 closed). The purpose of this resistor is the same as in the first embodiment: to reduce the DC current "Ig" so that I1r=I2r, with good approximation.

As for the first embodiment, it is understood that all units may be contained within one chassis, shown with solid line 7 and having ground symbols with numerals 37 and 38. Alternatively, separate chassis 201, 202 with ground wire 200 may be provided.

The operation and constraints of the second embodiment are easily understood as soon as the first embodiment is understood and will not be described in greater detail here, except for an important comment in the case where the return wires 40 and 41 are connected together at the power supply module 23, as shown by dotted line 4 in the drawing. This may well be the case for many power supplies already designed into the system. In this case great care must be taken in making the DC resistances of windings 31 and 33 equal. since this is very difficult to obtain because 27 and 28 are selected at random from a large production batch or even picked from different production batches of common mode inductors, the currents "I1r" and "I2r" will generally be different and be divided between windings 31 and 33 in accordance with the actual conductance of these windings. If the embodiment of FIG. 3 is used, one must therefore be sure that there is no DC connection between 40 and 41 and the dashed line conductor 4 should not be present. When this separation is taken care of, the two common mode inductors may be independently optimized with respect to the impedance levels and the DC resistances, although a full degree of freedom in the design is not present due to the placement of the self resonant frequencies of the two inductors.

Figure 4:
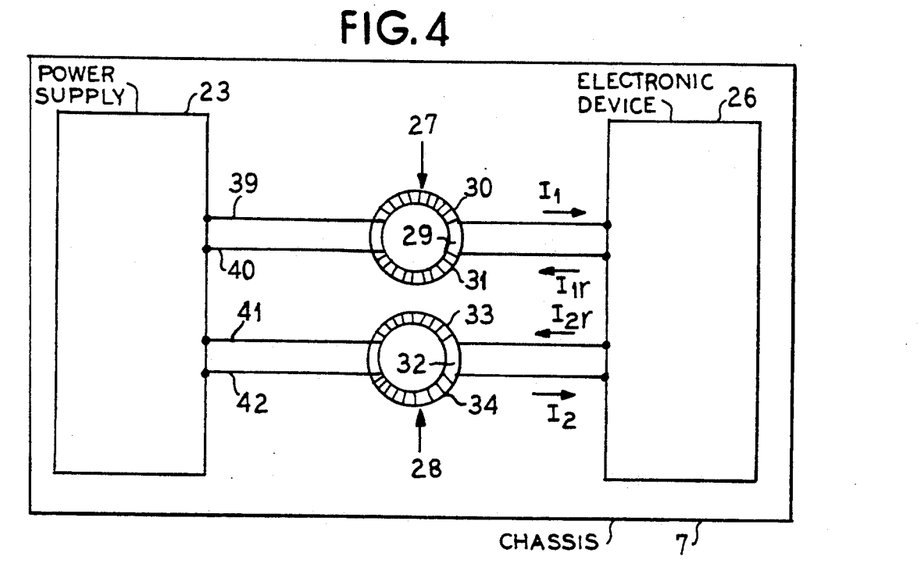
FIG. 4 is a diagram showing an electrostatic discharge noise suppression coil assembly as used in the second embodiment of FIG. 3.

FIG. 4 shows the electrostatic discharge noise suppression coils 27 and 28 used in the embodiment of FIG. 3. 29 and 32 are the ferrite cores, onto which windings 30/31 and 33/34 are wound, respectively, in such a way that the magnetic fields set up by currents I1/I1r and I2/I2r will cancel in the respective cores, but if and only if the I1=I1r and I2=I2r. It is understood that the components 27 and 28 can equally well be located within 23 if great care is taken in doing so, or 27 and 28 can be located in the device 26.

Figure 5:
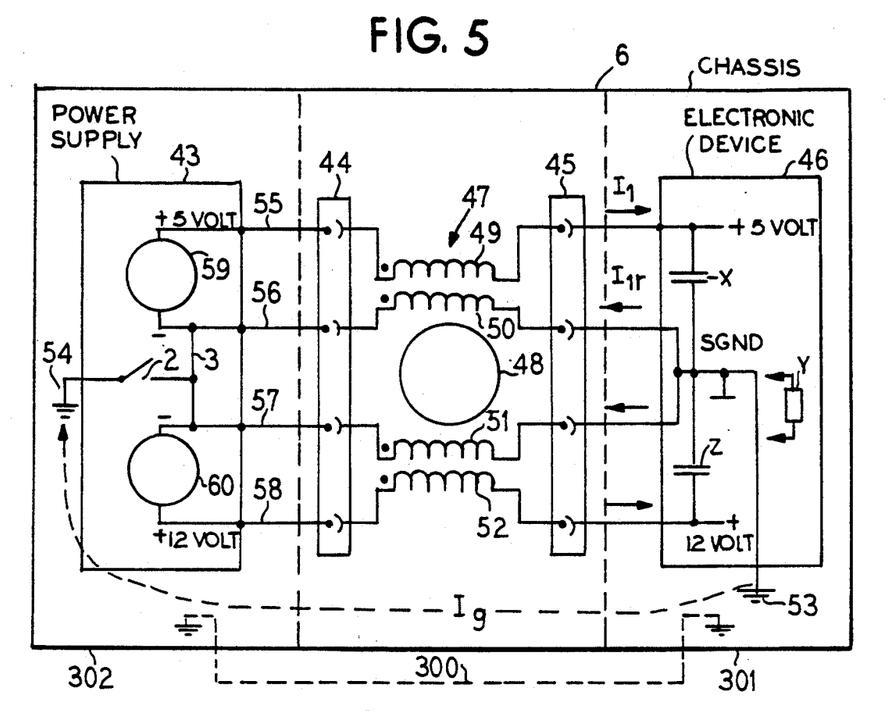
FIG. 5 is a circuit diagram showing an electrostatic discharge noise suppression method and system according to a third embodiment.

FIG. 5 is a schematic diagram showing the electrostatic discharge noise suppression method and system according to a third and preferred embodiment for multiple supplies. It is an improvement compared with the second embodiment because, unlike the embodiment of FIG. 3, the return wires 56 and 57 can freely be connected together as shown by solid line 3. If the DC chassis current Ig is zero, i.e. if the chassis connection 54 is not connected to the return wires 56 and 57, I1+I2=I1r+I2r, the core 48 will not be saturated with DC magnetic fields or not be close to saturation and a maximum advantage of the invention is obtained. If the chassis connection 54 of the return wires 56 and 57 at the power supply side must be maintained, one can minimize the DC chassis current Ig by introducing a low-value resistance "Y" between the signal ground "SGND" and the chassis point 53, as explained for the first embodiment. It is understood that the units 43, 44, 47, 45, 46 as well as the wires 55, 56, 57 and 58 shown are all contained within the same chassis 6, shown with ground symbols numbered 53 and 54 attached. Alternatively, separate chassis 301 and 302 with a connecting ground wire 300 may be provided. It is also understood that connections to external grounds via, for example, printer cables or local area network cables can also take place. Such connections can then form external ground loops with the ground cable of the mains supply which for safety reasons must connect to the chassis, usually at point 54.

In FIG. 5, 43 is the power supply module, comprising two power units 59 and 60, delivering +5 volt and +12 volt, respectively. It is understood that other voltage levels can be used. Also, multiple power units can be used if the magnetic ferrite core 48 is supplied with multiple sets of windings. The wires 55 and 56 from the +5 volt supply unit 59 go via a connector 44 through the windings 49 and 50, respectively, on the core 48 to another connector 45 and to the electronic device 46. Wire 55 carries current I1 which returns to the signal ground "SGND". Similarly, wires 58 and 57 connect via 44 to the windings 52 and 51, respectively, on the core 48 and go via connector 45 to the electronic device 46. Wire 58 carries current I2 which goes via a load not shown to the signal ground "SGND". The DC return currents I1r and I2r will now divide between windings 50 and 51 in accordance with their DC conductance, except for a small current Ig which, in some practical implementations may be allowed to flow in the low-valued resistor "Y". However, since all the four windings 49, 50, 51 and 52 are wound in the same direction on the core 48, current I1r need not be equal to I1, and I2r need not be equal to I2, if I1+I2=I1r+I2r, assuming that Ig is zero or is made so small that it can be neglected.

As explained for the first embodiment, the purpose of the common mode inductor 47 is, by its high level of common mode impedance for high frequencies, to prevent the flow of both chassis-internal ground currents and external ground currents released during the electrostatic discharge event. 47 will be very effective both for the front of the discharge waveform and for the oscillatory waveform of the external ground currents, usually in the lower MHz range, as explained for the first embodiment. Usually, the wires 55, 56, 57 and 58 are twisted together, and one can consider one main chassis-internal ground loop starting at the power supply side chassis ground point 54 where the strongest magnetic coupling to the loop takes place. The loop then consists of a parallel connection of the +5 volt path and the +12 volt path: A): 59 in series with 55/56 and B): 60 in series with 57/58, going on all four wires 55, 56, 57 and 58 to the common mode inductor 47, further going via both return wires and the capacitors "X" and "Z" to the signal ground "SGND". Further, the loop goes to the other chassis connection 53, optionally through the low-value resistor "Y", which is so small that it can not prevent the noise currents from flowing, and back via the chassis to the connection 54 at the power supply side. The external ground loop can also be considered to start at the point 54 where the strongest magnetic coupling is, follow the above mentioned loop to the chassis ground point 53, go out of the chassis via external signal cables connected to 53 and further to external ground connections, typically found at the mains ground connections of other mains-powered equipment, say a display monitor or a printer, and finally closing the loop via the mains ground to the starting chassis point 54. Additionally, minor differential loops exists within the embodiment shown in FIG. 5. For these differential voltages, the operation of the circuit is similar to what was found for the first embodiment and will not be described here.

Figure 6:
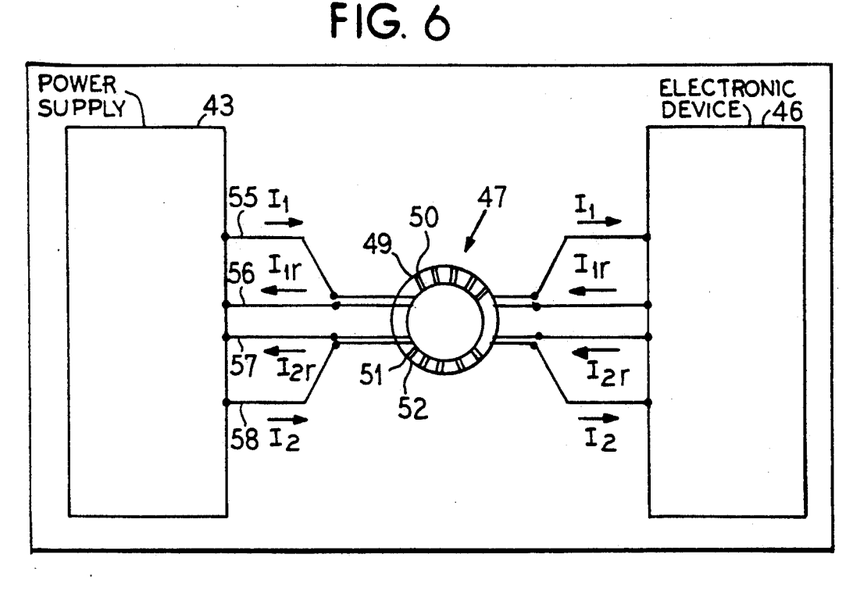
FIG. 6 is a diagram showing an electrostatic discharge noise suppression coil assembly according to the third embodiment of FIG. 5.
Figure 9:
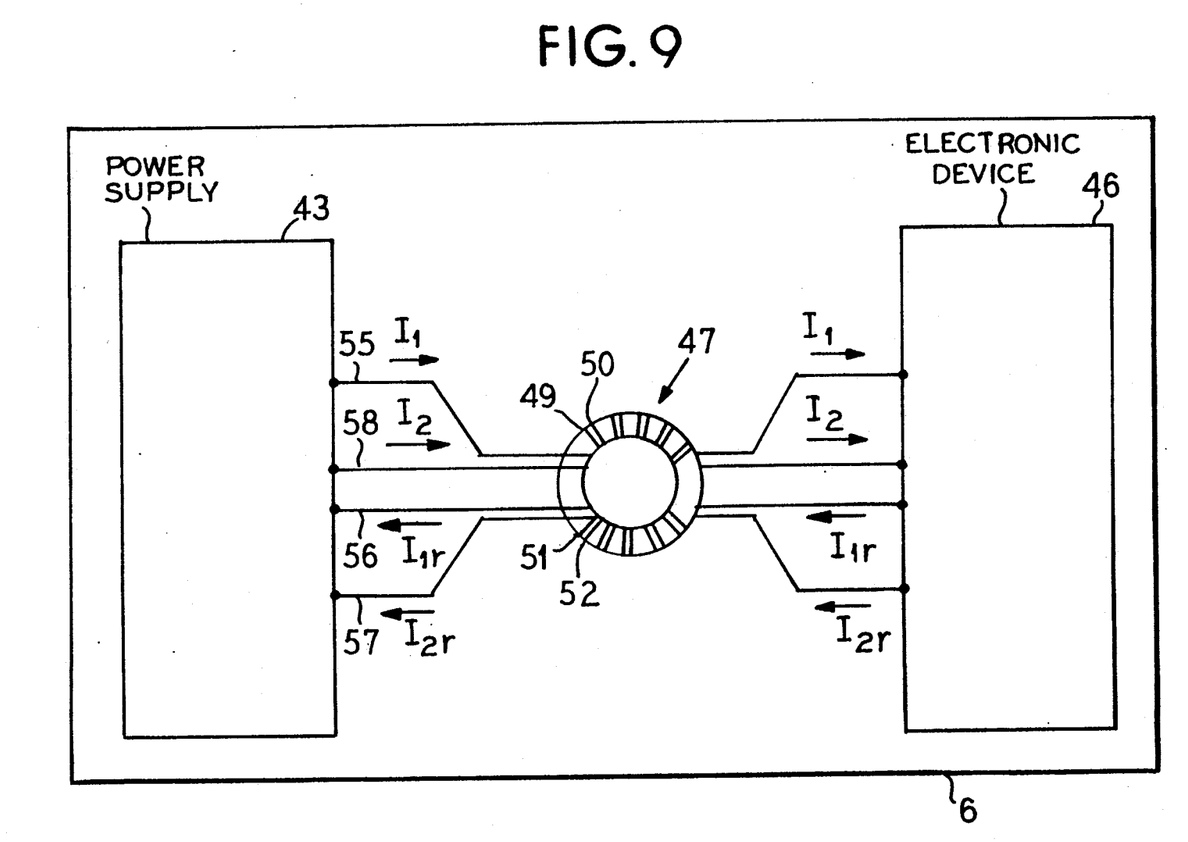
FIG. 9 is an alternate embodiment of FIG. 6.

FIG. 6 is a diagram showing an electrostatic discharge noise suppression coil 47 used in the third embodiment of FIG. 5. It is assumed that both the power supply 43, the wires 55, 56, 57 and 58, the common mode inductor 47 and the electronic device 46 are contained within the same chassis 6. The currents from one power unit, I1 and I1r, both go in a pair of windings 49 and 50. The currents from the other power unit, I2 and I2r, go in the other pair of windings 51 and 52. These winding pairs can typically be made of bifilar windings to improve the impedance balance for common mode waves which follow the wires 55/56 or 57/58. Currents I1 and I2 can also be carried by the pair 55/56 and currents I1r and I2r by pair 57/58. Other winding schemes also exist. As shown in FIG. 9, in an alternate embodiment the currents I1 and I2 can be on the same bifilar winding and the currents $I_{1R}$ and $I_{2R}$ can be on the other bifilar winding on the same core.

Figure 7:
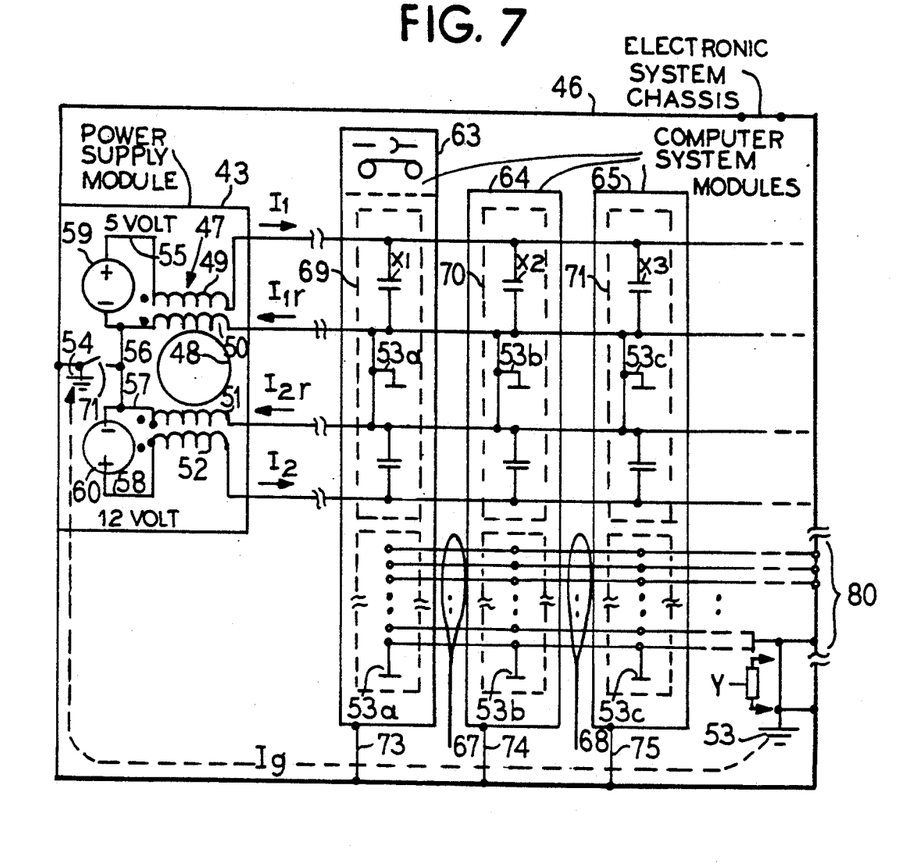
FIG. 7 is a circuit diagram showing the embodiment of FIG. 5 but expanded to show application of the inventive method and system wherein the electronic device comprises electronic computer modules.

FIG. 7 is a schematic diagram illustrating in greater detail an application of my electrostatic discharge noise suppression method and system according to the third embodiment of FIGS. 5 and 6, wherein the electronic device comprises computer system modules such as 63, 64 and 65. However, the number of modules may be greater than three as indicated in the figure. Only one set of output DC voltages from the power supply module 43 is shown, supplying all modules 63, 64, and 65. Often, more outputs are provided, each output supplying typically two electronic modules. In the drawing, the one four-wire common mode inductor 47 shown in FIGS. 5 and 6 is contained within the power module 43. By doing so, the electrostatic discharge noise conducted by the DC wires is stopped at the location where it originates. In this case, it is possible to protect multiple subassemblies 63, 64 and 65 which do not have the built-in two- or four-wire common mode protection for electrostatic discharge. In FIG. 7, the chassis which encloses both the power module 43, the electronic devices 63, 64 and 65, or more, and the data bus 67, is shown as 46. Internally in the electronic devices 69, 70 and 71, decoupling capacitors are shown as "X1", "X2", "X3", "Z1", "Z2", and "Z3". These have been indicated to show that the electrostatic discharge common mode current path includes these capacitors, as well as the return wires, before the noise currents go to the local signal grounds shown as 53a, 53b and 53c. These signal grounds are normally the same as the ground connected to the data bus 67/68. Therefore, the data bus signal grounds have the corresponding numerals. The common mode noise path further goes via the data bus ground to the chassis point 53, where an optional resistor "Y" can be inserted, as previously explained if the power supply is not floating as would be represented by switch 71 being closed. It is also indicated, by 80, that the data bus can extend to external devices. The discharge noise path will then also include an external ground loop, and oscillatory common mode voltages (see FIG. 8) are set up. The inventive method and system is especially well suited to attenuate these low-MHz oscillations. Further, the modules themselves are connected to the chassis at points 73, 74, and 75. The internal leakage DC current is indicated with "Ig". This should ideally be kept to zero or minimized by the resistor "Y".

In a variation of the FIG. 7 embodiment, a distributed electrostatic discharge protection scheme may be provided by removing the common mode inductor(s) 47 from the power supply unit 43 and including common mode inductors in each of the electronic devices 63, 64 and 65 or more. The advantage of this approach is that each common mode inductor can be optimized for the DC current drawn by each of the modules 63, 64 and 65 or more, thus providing the highest possible impedance in the sub-loop where it is located. In accordance with this scheme, it is understood that the invention includes the use of four-wire or two-wire common mode inductors in module 63 when it consists of a tape cartridge streamer for data storage, as indicated. The invention also includes the use of such common mode inductors in other data storage peripheral devices, say, if module 64 is a hard disk and 65 is a diskette drive. The invention is equally well valid if the electronic device module is any other subsystem, such as, for example, an optical storage device.

Figure 8:
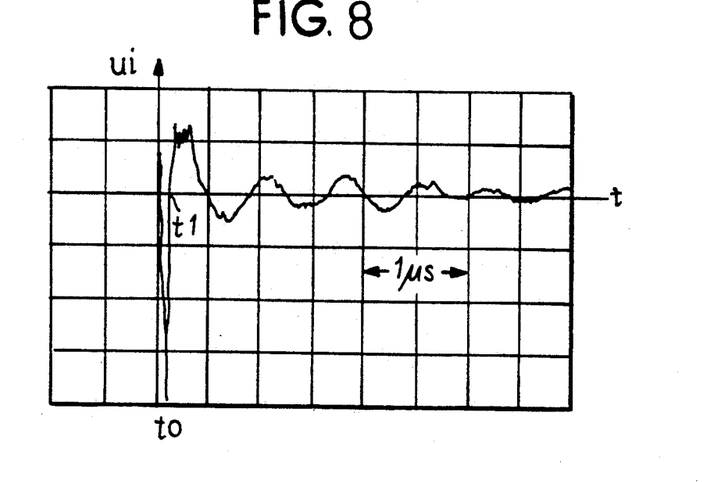
FIG. 8 is a typical pulse diagram showing a measured electrostatic discharge noise oscillation on one line of a data bus in FIG. 7 when the invention is not provided.

FIG. 8 shows a noise waveform measured on one line of a data bus like that shown in FIG. 7, but without the protection of the invention. Discharge in an external common mode loop was simulated measured. The initial pulse has a peak of −4 volt, then the low-MHz oscillation follows. After insertion of a four-wire common mode inductor according to the invention, the oscillatory waveform was totally eliminated, and the negative peak was reduced to −1 volt.

Although various minor changes and modifications might be proposed by those skilled in the art, it will be understood that I wish to include within the claims of the patent warranted hereon all such changes and modifications as reasonably come within my contribution to the art.

I claim as my invention:

1. An electrostatic discharge noise suppression system, comprising:
   an electronic device and a power supply for the electronic device;
   chassis means for receiving the power supply and the electronic device and for providing chassis ground;
   the power supply being located at one portion of the chassis means and having a DC power supply voltage output of a first polarity and a DC power supply voltage return of an opposite second polarity;
   the electronic device being located at another portion of the chassis means and having a DC voltage input of said first polarity and a DC voltage return of said opposite second polarity;
   a common mode inductor means for suppressing electrostatic discharge noise emanating from the power supply and having a common core and first and second windings thereon, the first winding connecting the power supply DC voltage output to the electronic device DC voltage input and the second winding connecting the power supply DC voltage return to the electronic device DC voltage return; and
   means for preventing saturation of said common core by minimizing a difference in magnitude between a DC supply current flowing from the power supply to the electronic device through the first winding and a DC return current flowing from the electronic device back to the power supply through the second winding by minimizing a DC ground return current from flowing via chassis ground from said electronic device to said power supply, said means for preventing saturation DC separating said power supply opposite polarity DC voltage return from chassis ground at the location of the power supply.

2. A system according to claim 1 wherein said DC voltage return at the electronic device is directly DC electrically connected to the chassis ground at the location of the electronic device.

3. A system according to claim 1 wherein said chassis means comprises a common chassis within which is located both the power supply and the electronic device.

4. A system according to claim 1 wherein said chassis means comprises two separate chassis, one for the power supply and one for the electronic device.

5. A system according to claim 4 wherein an electrical connection means for permitting ground currents to flow from the one chassis to the other is provided.

6. A system according to claim 5 wherein said electrical connection means comprises a wire electrically connecting the one chassis to the other.

7. A system according to claim 1 wherein the electronic device comprises at least one of a computer module or a computer peripheral module.

8. A system according to claim 1 wherein the electronic device comprises a tape drive means for a computer.

9. A system according to claim 1 wherein said common mode inductor means comprises a toroidal core.

10. A system according to claim 1 wherein the two windings of the common mode inductor means are wound such that differential mode interference currents are attenuated.

11. An electrostatic discharge noise suppression system, comprising:
    an electronic device and a power supply for the electronic device;
    chassis means for receiving the power supply and the electronic device and for providing chassis ground;
    the power supply being located at one portion of the chassis means and having a DC power supply voltage output of a first polarity and a DC power supply voltage return of an opposite second polarity;
    the electronic device being located at another portion of the chassis means and having a DC voltage input of said first polarity and a DC voltage return of said opposite second polarity;
    a common mode inductor means for suppressing electrostatic discharge noise emanating from the power supply and having a common core and first and second windings thereon, the first winding connecting the power supply DC voltage output to the electronic device DC voltage input and the second winding connecting the power supply DC voltage return to the electronic device DC voltage return; and
    means for preventing saturation of said common core by minimizing a difference in magnitude between a DC supply current flowing from the power supply to the electronic device through the first winding and a DC return current flowing from the electronic device back to the power supply through the second winding by minimizing a DC ground return current from flowing via chassis ground from said electronic device to said power supply, said means for preventing saturation DC separating said electronic device DC voltage return from chassis ground at the location of the electronic device.

12. A system according to claim 11 wherein the power supply DC voltage return is directly DC electrically connected to the chassis ground at the location of the power supply.

13. A system according to claim 11 wherein the DC separating of said electronic device DC voltage return from chassis ground comprises a resistance between the DC voltage return and chassis ground at the location of the electronic device.

14. A system according to claim 11 wherein said chassis means comprises a common chassis within which is located both the power supply and the electronic device.

15. A system according to claim 11 wherein said chassis means comprises two separate chassis, one for the power supply and one for the electronic device.

16. A system according to claim 15 wherein an electrical connection means for permitting ground currents to flow from the one chassis to the other is provided.

17. A system according to claim 16 wherein said electrical connection means comprises a wire electrically connecting the one chassis to the other.

18. A system according to claim 11 wherein the electronic device comprises at least one of a computer module or a computer peripheral module.

19. A system according to claim 11 wherein the electronic device comprises a tape drive means for a computer.

20. A system according to claim 11 wherein said common mode inductor means comprises a toroidal core.

21. An electronic discharge noise suppression system, comprising:
an electronic device and a power supply for the electronic device;
chassis means for receiving the power supply and the electronic device and for providing chassis ground;
the power supply being located at one portion of the chassis means and having first and second DC power supply voltage outputs of a first polarity and first and second DC power supply voltage returns of an opposite second polarity;
the electronic device being located at another portion of the chassis means and having first and second DC voltage inputs of said first polarity and first and second DC voltage returns of said opposite second polarity;
a common mode inductor means for suppressing electrostatic discharge noise emanating from the power supply comprising first and second common cores and first and second windings on each core, the first core first winding connecting the power supply first DC voltage output to the electronic device first DC voltage input, the first core second winding connecting the power supply first DC voltage return to the electronic device first DC voltage return, the second core first winding connecting the power supply second DC voltage output to the electronic device second DC voltage input, and the second core second winding connecting the power supply second DC voltage return to the electronic device second DC voltage return; and
means for preventing saturation of said first and second common cores by minimizing a difference in magnitude between respective DC supply currents flowing from the power supply to the electronic device through the first windings of the first and second cores and respective DC return currents flowing from the electronic device back to the power supply through the second windings by minimizing DC ground return currents from flowing via chassis ground from said electronic device to said power supply, said means for preventing saturation DC separating said power supply opposite polarity first and second DC voltage returns from chassis ground at the location of the power supply.

22. An electrostatic discharge noise suppression system, comprising:
an electronic device and a power supply for the electronic device;
chassis means for receiving the power supply and the electronic device and for providing chassis ground;
the power supply being located at one portion of the chassis means and having first and second DC power supply voltage outputs of a first polarity and first and second DC power supply voltage returns of an opposite second polarity;
the electronic device being located at another portion of the chassis means and having first and second DC voltage inputs of said first polarity and first and second DC voltage returns of said opposite second polarity;
a common mode inductor means for suppressing electrostatic discharge noise emanating from the power supply comprising first and second common cores and first and second windings on each core, the first core first winding connecting the power supply first DC voltage output to the electronic device first DC voltage input, the first core second winding connecting the power supply first DC voltage return to the electronic device first DC voltage return, the second core first winding connecting the power supply second DC voltage output to the electronic device second DC voltage input, and the second core second winding connecting the power supply second DC voltage return to the electronic device second DC voltage return; and
means for preventing saturation of said first and second common cores by minimizing a difference in magnitude between respective DC supply currents flowing from the power supply to the electronic device through the first windings of the first and second cores and respective DC return currents flowing from the electronic device back to the power supply through the second windings of the first and second cores by minimizing DC ground return currents from flowing via chassis ground from said electronic device to said power supply, said means for preventing saturation DC separating said electronic device first and second DC voltage returns from chassis ground at the location of the electronic device.

23. An electrostatic discharge noise suppression system, comprising:
an electronic device and a power supply for the electronic device;
chassis means for receiving the power supply and the electronic device and for providing chassis ground;
the power supply being located at one portion of the chassis means and having first and second DC power supply voltage outputs of a first polarity and first and second DC power supply voltage returns of an opposite second polarity;

the electronic device being located at another portion of the chassis means and having first and second DC voltage inputs of said first polarity and first and second DC voltage returns of said opposite second polarity;

a common mode inductor means for suppressing electrostatic discharge noise emanating from the power supply comprising a common core and first and second bifilar windings on the core, the first bifilar winding comprising a first winding connecting the power supply first DC voltage output to the electronic device first DC voltage input and a second winding connecting the power supply first DC voltage return to the electronic device first DC voltage return, the second bifilar winding comprising a first winding connecting the power supply second DC voltage output to the electronic device second DC voltage input and a second winding connecting the power supply second DC voltage return to the electronic device second DC voltage return; and means for preventing saturation of said first and second common cores by minimizing a difference in magnitude between respective DC supply currents flowing from the power supply to the electronic device through the first windings of the first and second bifilar windings and respective DC return currents flowing from the electronic device back to the power supply through the second windings by minimizing the first and second DC ground return currents from flowing via chassis ground from said electronic device back to said power supply, said means for preventing saturation DC separating said power supply opposite polarity first and second DC voltage returns from chassis ground at the location of the power supply.

24. An electrostatic discharge noise suppression system, comprising:

an electronic device and a power supply for the electronic device;

chassis means for receiving the power supply and the electronic device and for providing chassis ground;

the power supply being located at one portion of the chassis means and having first and second DC power supply voltage outputs of a first polarity and first and second DC power supply voltage returns of an opposite second polarity;

the electronic device being located at another portion of the chassis means and having first and second DC voltage inputs of said first polarity and first and second DC voltage returns of said opposite second polarity;

a common mode inductor means for suppressing electrostatic discharge noise emanating from the power supply comprising a common core and first and second bifilar windings on the core, the first bifilar winding comprising a first winding connecting the power supply first DC voltage output to the electronic device first DC voltage input, and a second winding connecting the power supply first DC voltage return to the electronic device first DC voltage return, the second bifilar winding comprising a first winding connecting the power supply second DC voltage output to the electronic device second DC voltage input and a second winding connecting the power supply second DC voltage return to the electronic device second DC voltage return; and means for preventing saturation of said common core by minimizing a difference in magnitude between respective DC supply currents flowing from the power supply to the electronic device through the first windings of the first and second bifilar windings and respective DC return currents flowing from the electronic device back to the power supply through the second windings of the first and second bifilar windings by minimizing DC ground return currents from flowing via chassis ground from said electronic device to said power supply, said means for preventing saturation DC separating said electronic device first and second DC voltage returns from chassis ground at the location of the electronic device.

* * * * *